Feb. 7, 1956 C. W. VOGT 2,733,673
PRODUCTION OF FORMED MASSES OF PLASTIC MATERIAL
Filed Aug. 16, 1949 6 Sheets-Sheet 1

Fig. 1

INVENTOR
CLARENCE W. VOGT
BY
Hubert E. Evans
ATTORNEY

Feb. 7, 1956  C. W. VOGT  2,733,673
PRODUCTION OF FORMED MASSES OF PLASTIC MATERIAL
Filed Aug. 16, 1949  6 Sheets-Sheet 2

INVENTOR
CLARENCE W. VOGT
BY
Hubert E. Evans
ATTORNEY

Feb. 7, 1956   C. W. VOGT   2,733,673
PRODUCTION OF FORMED MASSES OF PLASTIC MATERIAL
Filed Aug. 16, 1949   6 Sheets-Sheet 3

INVENTOR
CLARENCE W. VOGT
BY
Hubert E. Evans
ATTORNEY

Feb. 7, 1956 C. W. VOGT 2,733,673
PRODUCTION OF FORMED MASSES OF PLASTIC MATERIAL
Filed Aug. 16, 1949 6 Sheets-Sheet 6

INVENTOR
CLARENCE W. VOGT
BY
Hubert E. Evans
ATTORNEY

United States Patent Office 2,733,673
Patented Feb. 7, 1956

2,733,673

PRODUCTION OF FORMED MASSES OF PLASTIC MATERIAL

Clarence W. Vogt, Norwalk, Conn.

Application August 16, 1949, Serial No. 110,635

11 Claims. (Cl. 107—54)

This invention relates to the production of masses of plastic substances and in particular to a method of and apparatus for producing measured units of plastic material which may be deposited onto enwrapments or sheet material in suitable condition for packaging.

This application is a continuation-in-part of my copending applications: Serial No. 71,195 filed January 15, 1949, now Patent No. 2,653,430, dated September 29, 1953, and entitled Method of and Apparatus for Producing Packaged Units of Commodities; Serial No. 90,852 filed May 2, 1949, and entitled Production and Packaging of Plastic Materials; Serial No. 95,270 filed May 25, 1949, now Patent No. 2,666,400, dated January 19, 1954, entitled Production of Plastic Masses; Serial No. 93,599 filed May 16, 1949, now Patent No. 2,665,648, dated January 12, 1954, entitled Production of Plastic Masses; and Serial No. 100,065 filed June 18, 1949, now Patent No. 2,703,537, dated March 8, 1955, and entitled Forming and Depositing Masses of Plastic Materials.

It is an object of the present invention to provide a method of and apparatus for successively forming and depositing measured masses of plastic material onto one or more sequences of enwrapments in which the flow of plastic material may be continuously moved. The forcing or flowing of plastic intermittently tends to create changes in the character and properties of the plastic material due to the changes in pressure applied to the plastic as its flow is being stopped and started. If continuous flow of the plastic is provided greater uniformity in the properties of the plastic material will result. Also, continuously flowing the plastic will facilitate the obtaining of accurately measured masses as well as preventing any adverse effects on composition or physical characteristics of the plastic material.

Another object is to provide a method of and apparatus for forming masses of plastic material in which the feeding and forming operations may be accomplished with a minimum of working or mastication of the plastic. In present day commercial practices the forming or molding of the plastic often causes an overworking of the plastic to a point where the characteristics of the plastic will be detrimentally affected. For example in the forming or molding of margarine such overworking may tend to break down the fatty components of the plastic and may in addition force or exude water from the plastic. The present invention has been particularly designed to obviate these and other similar harmful effects.

A further object is to provide a method of and apparatus for forming masses of plastic material by flowing said plastic in a continuous stream and diverting the stream successively to one of a plurality of forming means.

A still further object is to provide a method of and apparatus for producing formed masses of plastic material in which the plastic may be flowed continuously through a metering device and to a flow director which directs the flow of the stream to one of a plurality of forming means with an accumulator to receive the flow from said metering device during the time that the flow director is functioning to change the flow of the stream from one forming means to another.

Another object is to provide a method of and apparatus for producing molded masses in which the mass may be removed or severed from the forming means in such a manner that the accuracy of the predetermined quantity of the mass will not be varied due to adherence of the plastic to the forming or severing means.

Another object is to provide a method of and apparatus for producing accurately molded masses of a predetermined size, shape, and quantity which may be deposited onto sheet material or enwrapments and removed from the forming means for packaging. If desired the masses may be sheared or severed to facilitate removal from the forming means with the severing means being cleaned or wiped to remove plastic material tending to adhere thereto.

Another object is to provide a method of and apparatus for forming masses of plastic material which may be utilized to handle plastics having a relatively stiff consistency which consistency is considerably stiffer than can be handled by present day commercial apparatus. For example, in the forming and packaging of quarter-pound prints of butter from butter which has been stored at a temperature of approximately 32° F. it is at present necessary to remove the butter from storage and permit it to temper or stand at higher temperatures so that it will be soft enough to be formed. The time involved in these tempering operations may be 24 or 48 hours. In accordance with the present invention it is proposed to materially shorten or do away with entirely these tempering operations.

Other objects and advantages will become apparent from the following detailed description accompanied by the drawings in which.

The present invention deals with the production of units or masses of a plastic substance or materials. For the purposes of this description the term "plastic substance" or "plastic material" means a semi-plastic or plastic or partially set or solidified substance which under the conditions at the time it is being acted on may be formed or molded or extruded by the use of relatively low pressures. Such materials may be flowed or forced through conduits or passages by the application of pressure. However, such materials will generally not flow under the influence of gravity to an appreciable extent. Examples of plastic materials to which the present invention may be applied are butter, margarine, lard, partially frozen confections such as ice cream, etc., and many other materials whether edible or not, having the capacity of being flowable or moldable.

In accordance with the present invention plastic masses may be produced by the following steps:

1. Plastic material is received from a source of supply and is flowed into a metering device. The plastic material is preferably flowed under pressure continuously from the source of supply with sufficient flow being maintained to insure that the metering device receives an adequate supply under pressure. It is also contemplated that under certain circumstances it may be desirable that the metering device act as a booster to increase the pressure under which the plastic material is flowed.

2. From the metering device which preferably acts to transmit a continuously moving stream, the flow of the plastic material is successively directed to one of a plurality of locations where forming or extrusion of the plastic mass is to be accomplished.

3. At each of the forming locations the stream of plastic material is directed through a forming aperture to produce an accurately formed mass of a predetermined quantity of plastic material.

4. The mass of plastic material passing through the forming aperture is deposited onto a support which may be previously lined with sheet material suitable for packaging the mass or with a preformed enwrapment.

5. When the mass has been deposited onto the support member the mass and the support may be removed from the receiving position adjacent the forming aperture. Prior to such removal it may be desirable in connection with certain plastics to sever or shear the stream of plastic at the desired point. However it may not always be necessary to positively shear or sever the plastic stream.

Since the stream of plastic material preferably moves continuously from the source of supply and through the metering device it is beneficial to make allowance for plastic material flowing during the movement of the flow directing means when the plastic material cannot be transmitted directly to a forming aperture. An accumulator may be provided to temporarily receive plastic from the metering device during the change of direction of the flow of the stream. The plastic material thus accumulated may be restored to the stream as it is flowed to the forming means at the location to which the flow director changes.

Figure 1:
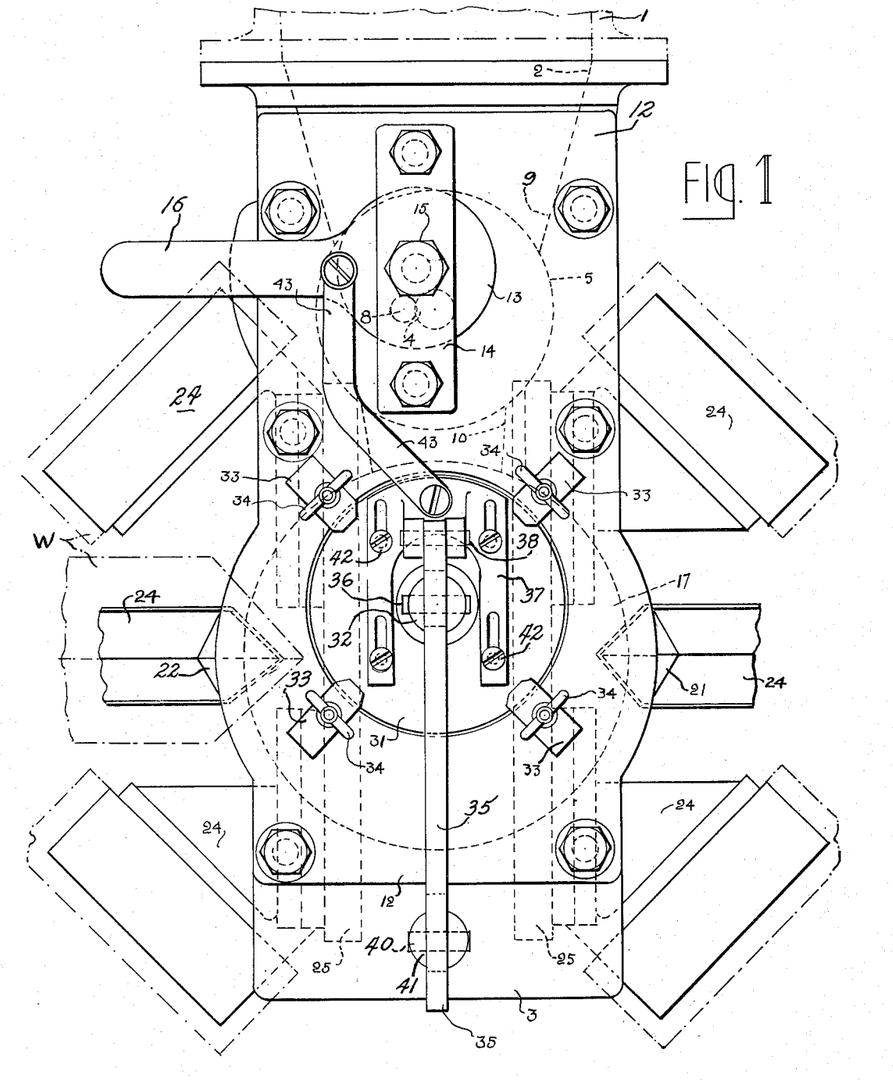
Figure 1 is a plan view of an apparatus which may be utilized for carrying out the present invention.
Figure 3:
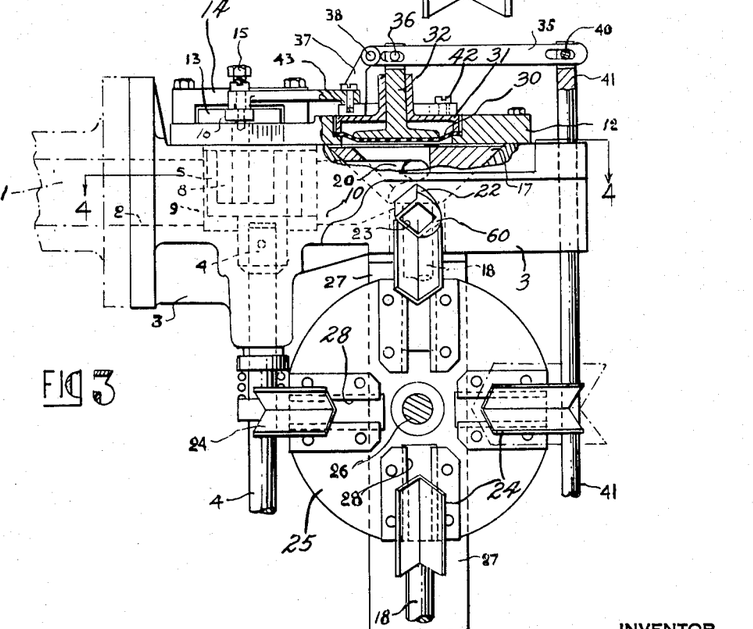
Fig. 3 is a side elevational view with parts broken away of the mechanism shown in Figs. 1 and 2.
Figure 4:
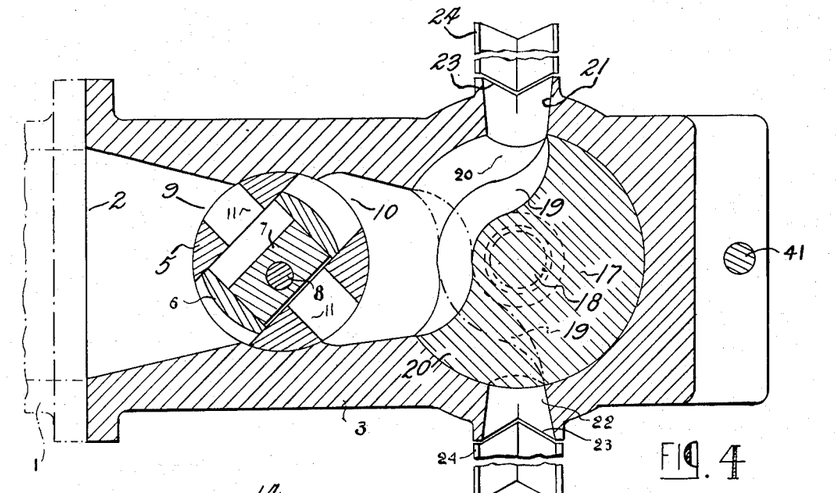
Fig. 4 is a sectional view taken substantially on line 4—4 of Fig. 3 to illustrate portions of the interior of the mechanism.

In the drawings Figs. 1, 3, and 4 illustrate diagrammatically a source of supply by dot and dash lines bearing the numeral 1. The source of supply may be any suitable means of providing a continuous flow of plastic material under pressure and the source of supply will be varied according to the plastic material being acted upon. In the case of butter which is produced in batches by a churn, the source of supply may be a conduit containing a rotating helical screw adapted to convey or force the butter from a feed hopper through the conduit. As will be seen later, apparatus embodying the present invention may utilize a relatively large diameter conduit and a corresponding relatively large diameter helical screw. This is beneficial because it is only necessary to advance the butter with sufficient pressure to insure an adequate supply for the metering device and when the screw and conduit have a relatively large diameter they will provide the desired supply without an undue amount of working or masticating of the butter. By contrast plastic materials such as margarine and ice cream may be produced in continuous process equipment and are transmitted from such equipment in a continuous stream under pressure generally through a relatively small conduit. If desired the source of supply may be provided with passages through which a heat transfer medium may be flowed to extract heat from or transmit heat to the plastic material being advanced therethrough.

From the source of supply the plastic material may be flowed to an inlet 2 of a casing 3 which casing houses a suitable metering device. As shown in Figs. 1 and 4 of the drawings, the inlet 2 to the casing 3 is relatively large and decreases in cross sectional area as it approaches the metering device. Such an inlet is illustrative of the type used for feeding a plastic advanced to the apparatus by a helical screw. Where the source of supply is a relatively small conduit such as from a continuous process apparatus for producing the plastic material, the inlet may be modified so that it has a constant cross-sectional area or may expand in cross sectional area. Further the casing 3 may be constructed to have passages therethrough to accommodate a suitable heat transfer medium so that the apparatus may be chilled or warmed to retain the plastic at the desired temperature, or to facilitate the flow of plastic material, or to accomplish other desired results.

The metering device may be of any suitable type but is preferably of a positive displacement type and preferably is continuously operated. As especially satisfactory metering device is a rotary piston type pump such as is disclosed in the Waite Patents No. 1,867,198 granted July 12, 1932, and No. 2,018,692 granted October 29, 1935. The drawings illustrate the pump or metering device as comprising a driven shaft 4, having mounted for rotation thereon a rotor 5. The rotor is generally cylindrical and is provided with a diametrical groove or recess in which is slideably mounted a piston member 6. The piston 6 is provided with a transversely disposed groove or recess in which a shuttle or secondary piston member 7 is mounted for sliding or reciprocating movement. The shuttle 7 contains a centrally disposed opening to receive a pin 8 which may be eccentrically mounted with respect to the rotor shaft 4. As the rotor 5 revolves, the eccentrically mounted pin 8 causes reciprocating movements of the shuttle 7 and also of the piston 6. The groove in the rotor in which the piston 6 is slidably mounted is open at its ends so that during each reciprocation of the piston a predetermined volume of plastic material is drawn in in the region of an inlet port 9 formed in the casing 3. After 180° of rotation of the rotor, the piston reciprocates in the opposite direction and discharges the plastic material to a discharge port 10. The rotor is provided with apertures 11 at points opposite the side faces of the shuttle 7. Thus during reciprocation of the shuttle 7 plastic material is drawn in through the apertures 11 and during further rotation of the rotor 5 the shuttle reciprocates in a direction to discharge the plastic through an aperture 11 to the discharge port 10.

Since during each revolution of the rotor the piston and shuttle are moved to the opposite limits of their reciprocating travel, four charges of material are picked up at the inlet port and ejected at the discharge port. Looking at Fig. 4, the rotor 5 is driven in a clockwise direction and it may be seen that the right-hand face of the shuttle 7 is just completing a discharge stroke while the left-hand face of the shuttle is completing an intake stroke. At the same time the left-hand end of the piston 6 is beginning an intake stroke while the right-hand end of the piston 6 is beginning a discharge stroke.

The pockets created by reciprocation of the shuttle and piston may have an identical volume by proper dimensioning of these parts so that during each half revolution of the rotor two identical charges of plastic material may be ejected or forced into the discharge port.

Further, the inlet and discharge ports may be proportioned so that there is an overlapping of the adjacent intake and outlet strokes of the piston and shuttle to provide an even flow with a minimum of pulsation. For the handling of plastic materials it may be desirable to curve or shape the configuration of the apertures 11 through the rotor 5 and other portions through which the plastic flows to facilitate the flow of the plastic material without the use of undue force or pressure.

The casing member and pump chamber are adapted to be closed and sealed by a cover plate 12. Mounted in the cover plate 12 is a rotary member or cap 13 in which an end of the pin 8 is mounted. The cap member 13 is held to the cover plate 12 by a yoke 14 bolted thereto. A set screw 15, threadedly mounted in the yoke, bears against and retains the cap 13 in its proper position. The cap 13 is provided with a handle member 16 and movement of the handle will cause a rotary movement of the cap 13 which causes the pin 8 to describe an arc thus effecting a change in the eccentricity of the pin 8 with respect to the pump shaft 4. This change in the eccentricity of the pin varies the length of stroke of the piston 6 and shuttle 7 changing the volume of the charges transmitted during rotation of the shaft 4.

The flow director is mounted adjacent the discharge port of the metering device and in the form shown comprises a conical valve body 17 carried on a shaft 18 which may be driven with an oscillating motion in any suitable manner (not shown). The conical valve body 17 rests in a conical recess in the casing 3 and is provided with shaped surfaces 19 formed into the conical exterior to provide passages 20 leading from the discharge of the metering device to one of a pair of forming apertures or nozzles 21 and 22 respectively. In Figs. 3 and 4 the flow director is disposed so that the passages 20 communicate between the discharge port 10 of the metering device and conduct plastic material therefrom to the forming nozzle or aperture 21. When the desired amount of plastic material has been flowed by the metering device through the passages 20 and through the forming nozzle 21, the conical valve body 17 may be oscillated so that the shaped surfaces 19 are disposed in their dot and dash position (shown in Fig. 4) and at that time the passages 20 may act to conduct plastic material from the discharge port 10 through the forming nozzle or aperture 22.

The drawings illustrate the forming apertures 21 and 22 as downwardly inclined passages generally perpendicularly disposed with respect to the conical surface of the valve body 17. These discharge nozzles 21 and 22 terminate in square shaped openings 23 which correspond to the desired cross sectional configuration of the mass to be produced. Although the drawings show the openings 23 as square it will be understood that they may be round, triangular, hexagonal, or other desired cross sectional configuration.

To receive a formed mass of plastic material from the nozzle openings a series of support members may be mounted to travel in a path which will place them at receiving position at the desired time. Such support members may for example, be carried by a pair of endless conveyors and mounted to move successively adjacent the two nozzles in proper timed sequence. The drawings illustrate a plurality of V-shaped jaw members 24 mounted for rotation on wheels 25 carried by stub shafts 26 which may be driven in any suitable manner (not shown). The stub shafts 26 may be journaled in brackets 27 suspended from the central under portion of the casing 3 which brackets may also extend downwardly and support the casing at the desired height. The jaw members or supports 24 may also be slidably mounted with respect to the wheels 25 in radially disposed tracks or guideways, indicated by the numeral 28, provided in the wheels 25.

Figure 2:
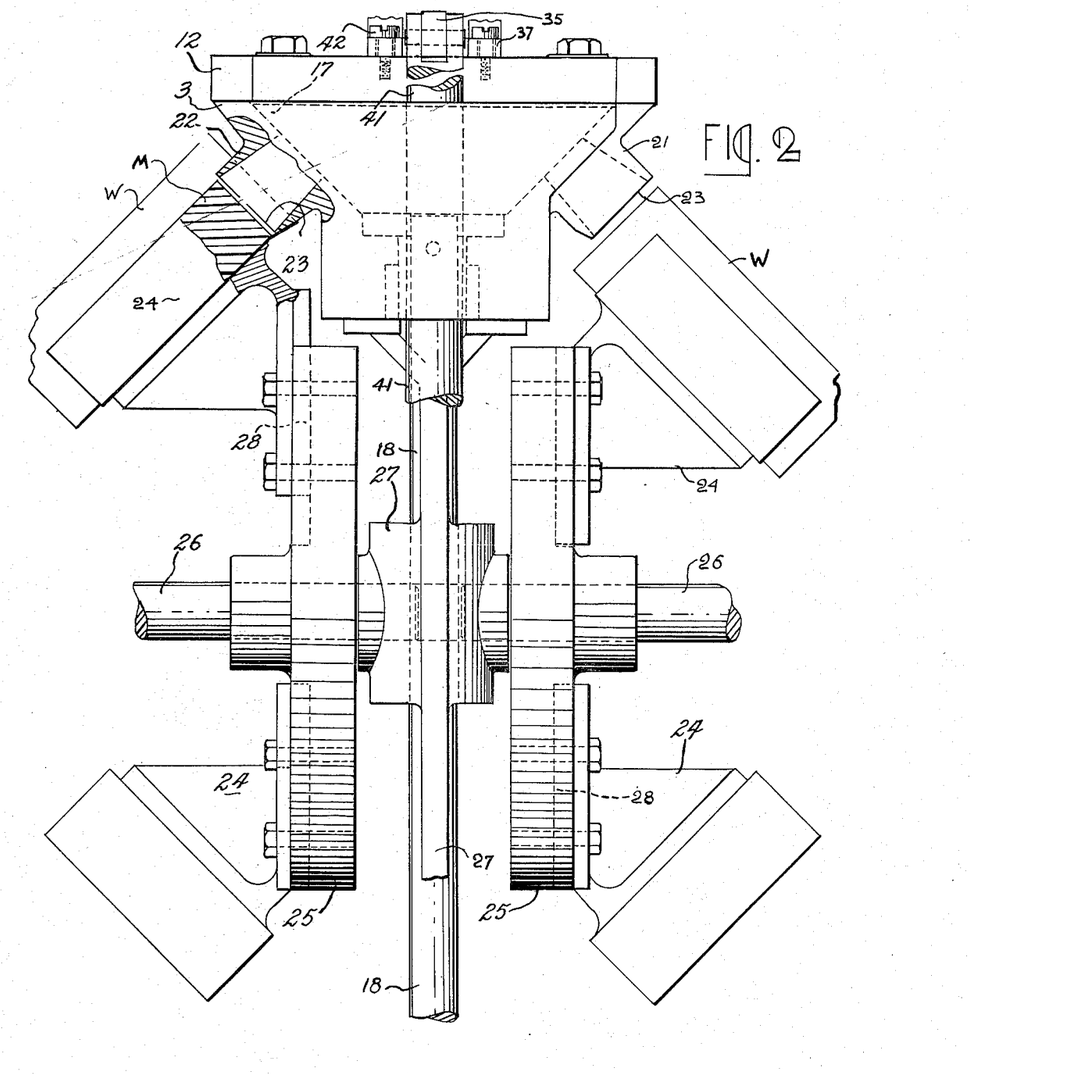
Fig. 2 is an end elevational view with parts broken away to illustrate portions of the mechanism shown in Figure 1.

The wheels 25 may be driven with an intermittent motion, dwelling when a jaw member is disposed at the top of the wheel. During this dwelling a suitable cam or link motion may actuate the jaw to raise it into receiving position with respect to its nozzle. Prior to the movement of the member 24 to its receiving position it may be provided with a suitable enwrapment or sheet material for forming an enwrapment. It is believed preferable to utilize a preformed enwrapment of the type disclosed and claimed in my copending application Serial No. 83,044 filed March 23, 1949, and now abandoned, and entitled Articles for Use in Packaging. The enwrapment may comprise a section of sheet material having one edge folded upon itself to a V-shaped configuration. Fig. 2 illustrates a support member 24 having an enwrapment W disposed therein and with a mass M of plastic material received therein from the nozzle 22. The support member 24 may then be advanced to complete the packaging of the plastic mass M.

To take care of the flow of plastic material from the metering device during the change in position of the conical valve body 17, a suitable form of accumulator may be provided. It is believed that the accumulator should be positive in its action so that it may receive the flow of plastic from the metering device and will also evacuate itself at the proper time. A desirable form of accumulating device may best be seen in Fig. 3. The cover plate 12 is apertured above the valve body 17 and in the region of the passages 20 leading from the discharge port 10 of the metering device to the forming nozzles 21 and 22. Around the circumference of the aperture a supporting ledge is provided to receive a circular, flexible, and elastic disk or diaphragm 30. The diaphragm 30 is held on the supporting ledge by a cap member 31 which is apertured to permit a plunger 32 to be slidably mounted in the cap member 31. The cap member is held to the cover plate 21 by a plurality of detachable dogs or clamps 33 which under the action of wing nuts 34 press the cap member against the diaphragm 30 and its supporting surface on the cover plate 12 (see Figs. 1 and 3).

This construction provides an accumulator pocket above the valve body 17 and opening to the plastic material being discharged from the metering device. This accumulator pocket may be emptied by downward movement of the plunger to a position where the bottom surface of the diaphragm 30 is flush with the lower surface of the cover plate 12. Preferably the accumulator pocket is dimensioned so that in its full position the diaphragm 30 is flat. This means that during the movement of the diaphragm it is stretched or flexed only in a single direction which will increase its useful life.

It may be seen that the accumulator is controlled by movement of the plunger 32 and such movement may be provided by means of a lever 35. The top portion of the plunger 32 is bifurcated to receive a portion of the lever 35 and to connect the lever to the plunger a pin 36 passes through a slot in the lever 35. A bracket 37 is mounted on the cap member 31 and carries a pin 38 to pivotally connect an end of the lever 35 to the bracket. The opposite end of the lever 35 is slotted to receive a pin 40 carried by the bifurcated ends of a reciprocating rod 41, which rod may be driven in timed relation with other portions of the mechanism by any suitable means (not shown). As the valve body 17 begins to oscillate to change the direction of the stream of plastic from one of the nozzles 21, 22 to the other, raising of the reciprocating rod 41 will cause upward movement of the plunger 32 to open or create an accumulating pocket. As this pocket increases in volume the plastic material discharged from the metering device will flow into the accumulating pocket rather than through the passages 20 and out of either of the nozzles. When the valve 17 has completed its oscillation and opened the passage 20 to the opposite nozzle the reciprocating rod 41 may be moved in the opposite or downward direction to lower the plunger 32 and decrease the volume of the accumulator pocket. The plastic in the accumulator pocket is returned to the passages 20 and will flow through the nozzle opened by the flow director.

As previously described the amount of plastic handled by the metering device may be varied by movement of the handle member 16 to change the amount of eccentricity of the pin 8 with respect to the shaft 4. It is considered preferable to provide an adjustment changing the stroke of the plunger 32 corresponding to the amount of plastic delivered by the metering device. The changing of the stroke of the plunger will vary the volume of the accumulating pocket to permit it to temporarily receive more or less of the plastic stream. Such an adjustment may be readily provided by mounting the bracket 37 so that it may have a sliding movement with respect to the cap 31. The legs of the bracket 37 may be slotted and held in the desired position by screws 42 which pass through the slots in the legs of the bracket and into the cap 31 (see Fig. 1). Movement of the bracket 37 will vary the distance of the pivot pin 38 about which the lever 35 pivots with respect to the pin 36 carried by the plunger 32 and with respect to the pin 40 carried by the reciprocating rod 41. Obviously this movement of the bracket 37 and pin 38 will change the lever arms by which the plunger is moved and will vary the length of its movement although the reciprocating rod 41 has a fixed amount of movement. This movement of the lever arm 35 with respect to the pin 36 of the plunger and the pin 40 of the reciprocating rod is possible due to the slots in the lever 35 through which these pins pass.

To permit the adjustment of the amount of plastic to be delivered by the metering device conjointly with the adjustment of the permissible size of the accumulator pocket, a curved link 43 may be pivotally connected at one end to the handle 16 and at its other end to a portion of the bracket 37. Then when it is desired to make the adjustment, the screws 42 which hold the bracket 37 in fixed position may be loosened. The set screw 15 which locks the position of the cap 13 may also be loosened. Movement of the handle 16 by the desired amount, through the link 43, will make a corresponding adjustment in the position of the pivot pin 38 carried by the bracket 37.

Figures 5, 6, 7, 8, 9, 11:
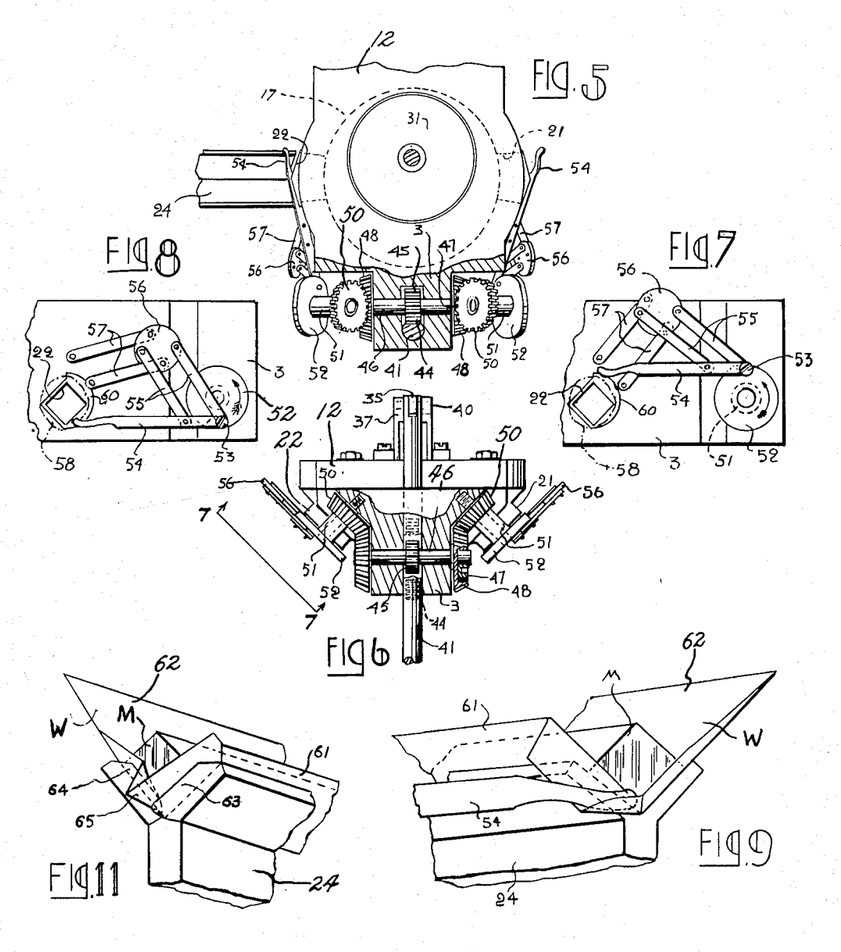
Fig. 5 is a fragmentary plan view showing further details of the mechanism.
Fig. 6 is an end elevational view, partly in section, of the portion of the apparatus shown in Fig. 5.
Fig. 7 is a view taken in the direction of line 7—7 of Fig. 6.
Fig. 8 is a view similar to Fig. 7 but illustrating the mechanism at another point in its operating cycle.
Fig. 9 is a fragmentary perspective view at the point where the plastic mass is deposited onto an enwrapment.
Fig. 11 is a fragmentary perspective view of the plastic mass at the time it is deposited but at the opposite end of that shown in Fig. 9.

The formed mass of plastic material in its deposited position upon the support member 24 may be removed from the end of the nozzle to wipe or shear the mass from the plastic stream extending through the nozzle in the manner shown in Figs. 6, 7, and 8 of my previously referred to Patent No. 2,703,537. Similarly a removal by moving in a direction parallel with a plane passing through the end of the nozzle after having folded the enwrapment to a tubular configuration about the mass is illustrated in Figs. 4 through 7 of my previously referred to copending application Serial No. 90,852. However, it is believed desirable, since the removal or separation requires dividing a solid stream of the plastic material, to sever or shear the formed plastic mass in a plane passing through the end of the nozzle at the opening 23. Figs. 5 through 8 illustrate a suitable mechanism for accomplishing this severing.

Figs. 5 and 6 illustrate the reciprocating rod 41 which is shown as reciprocating at the front end or nose of the casing 3. As may be seen the rod 41 passes through and is journaled in the casing 3. The rod 41 may be provided with rack teeth 44 which mesh with and engage a pinion 45 mounted for rotation on an oscillating stub shaft 46. The oscillating shaft 46 also carries a pair of overrunning clutches or ratchet and pawl mechanism indicated by the numeral 47. Exteriorly of the overrunning clutches and preferably integral with the driven members thereof, are bevel gear teeth 48 which mesh with and drive bevel gears 50 secured to a pair of shafts 51 carried by the casing 3 for rotation with respect thereto. Each upward stroke of the reciprocating rod 41 causes the rack teeth 44 to advance the pinion 45 and its shaft 46 to drive, through the clutches 47, the gear teeth 48 and the bevel gears 50. During the opposite or return stroke of the reciprocating rod 41 the teeth 44 mesh with and drive the pinion 45 and the shaft 46 but do not drive, due to the free wheeling action of the overrunning clutches 47, the gear teeth 48 or the bevel gears 50. The shafts 51 are thus given intermittent rotary movements or impulses, always in the same direction, as the rod 41 reciprocates.

Each of the shafts 51 has mounted thereon a disk or crank 52 which drives through an eccentrically mounted pin 53 a pantograph mechanism carrying a severing blade or knife 54. The eccentric pin 53 of the crank 52 passes through an aperture in an end of the blade 54 and in addition carries for pivotal movement an end of one of a pair of links 55. An end of the other of the links 55 is also pivotally connected to the blade 54. The opposite ends of the links 55 are pivotally connected to a disk 56 at spaced diametrically opposite points. A second pair of links 57 have free ends pivotally connected to the disk 56 at spaced diametrically opposite points and at their opposite ends are pivotally mounted to the casing 3.

The driving parts for the blade 54 are dimensioned and positioned so that each driving stroke of the reciprocating rod 41 advances the disk or crank 52 for a half a revolution. Preferably a conventional spring pressed ball and socket locking mechanism is provided to insure that the shaft 46 is indexed and stopped at a predetermined point at the end of each driving stroke of the reciprocating rod 41. In this way the lost motion of the various parts will not affect the advancing of the disk or crank 52 for a half of the revolution and the blades 54 will dwell at constant fixed points in their operating cycles. Figs. 7 and 8 illustrate the two dwelling positions of the one of the pair of blades 54 shown at the left side of Figs. 5 and 6. In Fig. 7 the blade is poised above the nozzle 22 and a driving stroke of the rod 41 will cause the blade to move downwardly across the face of the nozzle, acting to sever the stream of plastic which is at that time extending outwardly from the nozzle. The path of the tip of the cutter is illustrated by dot and dash lines indicated by the numeral 58 in Figs. 7 and 8. The blade 54 is mounted and held so that it presses against the end face of the nozzle during its movement across the nozzle opening to provide a proper shearing action. To permit suitable bearing surfaces for the blade 54, lands or surfaces 60 may be provided adjacent the end of the nozzle as shown in Figs. 7 and 8.

The driving mechanisms for the two blades 54 are timed and positioned with respect to each other so that when one of the blades is making its cutting stroke the other is returning to prepare for a cutting stroke. Thus, it may be seen that plastic masses are alternately deposited from the nozzles and carried away for packaging.

While the drawings illustrate the severing blades 54 as being relatively narrow elongated members moving in a generally circular or oval path, it will be obvious that other forms of severing mechanisms may be utilized. With certain plastic materials such as partially frozen plastics which may tend to become soft and even "runny," particularly during the starting-up period when uniform operating conditions have not yet been established, other severing mechanisms may be desired. It is contemplated for these types of materials that guided shutter-like blades having configurations similar to the openings 23 at the ends of the nozzles may be reciprocated from suitable points above the nozzles. This severing means is beneficial in that the ends of the nozzles are positively closed and thereby prevents the escape of any of the plastic material when flow through the nozzles is not desired. For other plastic materials it is believed that a relatively fine wire may be utilized to provide a satisfactory severing or removal of the formed plastic masses.

To assist in preventing plastic material from exuding from the forming or nozzle openings at the wrong time, it is considered desirable that the passages through the forming openings or nozzles be tapered to restrict such flow by shaping such passages so that their cross sectional areas diminish as the openings 23 at the ends of the nozzles are approached. While Figs. 2 and 4 seem to indicate that the passages through the forming openings or nozzles flare outwardly this illusion is caused by the fact that the forming openings adjacent the valve body 17 are circular in cross section and have greater area than the square openings at the ends 23 of the nozzles. The position of the rectangular openings in these views are such that they show their greatest dimension, that is, across opposite corners. In reality the cross sectional area diminishes from the interior to the outer ends of the passageways through the nozzles.

Since it is desirable to deposit a formed mass on the section of sheet material or enwrapment W inwardly from the marginal edges thereof, the supporting jaw member 24 is constructed so that its length conforms to the length of the mass to be formed and the sheet material or enwrapment W extends outwardly beyond the ends of the member 24. Fig. 2 illustrates that the edges of the sheet material or enwrapment W overlap with the portion of the nozzle which projects outwardly from the casing, however, the lands or portions 60 cause parts of the edge portions of the sheet material to be folded or bent to conform to the contour of the nozzle.

Figure 10:
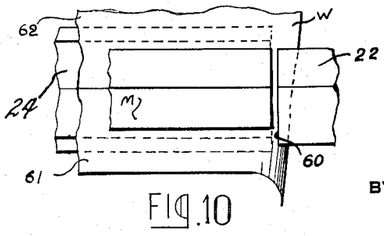
Fig. 10 is a fragmentary plan view at the time the plastic mass is deposited onto an enwrapment.

Fig. 9 is a perspective view looking outwardly from the nozzle to illustrate the position of the enwrapment W as the blade 54 completes its severance of the mass M of plastic material. In this view the mass is shown as having been extruded or formed from the nozzle 22 appearing at the left-hand side of Fig. 5. The numeral 61 indicates the leading flap of the enwrapment W while the numeral 62 designates the trailing flap. To further illustrate the position of the enwrapment at the time it is deposited, Fig. 10 shows a plan view with the blade 54 omitted.

When the mass of plastic material has been deposited in the enwrapment carried by supporting jaws 24 and has been severed from the stream of plastic material by the blade 54, the mass is in condition to be packaged. This may be accomplished by closing the leading and trailing flaps of the wrapper to a tubular configuration encompassing the plastic mass and then performing end folds to cover or enclose the ends of the mass. The completion of the packaging of the plastic masses is not completely disclosed in the present application because such wrapping operations may be performed in a conventional manner and satisfactory mechanism for accomplishing these steps is not considered an essential part of the present invention.

If desired, the leading and trailing flaps of the enwrapments may be folded to overlapping tubular configuration by folding members pivotally mounted on the V-shaped jaw members 24, such as, for example, is disclosed in my copending application Serial No. 90,852. In such case it may be noted that the trailing flap 62 of the enwrapment may be folded onto a side of the plastic mass towards the end of the severing action of the blade 54 and prior to removal of the jaw member from its position adjacent the nozzle. At the desired time the jaw member 24 may be lowered from its receiving position as illustrated at the upper left-hand side of Fig. 2 to its radially inward position on the wheel 25 as illustrated at the upper right-hand side of Fig. 2. When the supporting member 24 is lowered to a position where the plastic mass and its enwrapment may clear the under portion of the forming nozzle, the support member may be moved such as by rotation of the wheel 25, to advance another support member into a receiving position. It is believed desirable to accomplish the wrapping operations while the plastic mass and its enwrapment are still supported by the member 24. Suitable folding mechanism may be mounted adjacent the path of the member 24 to perform the necessary folding so that a completely wrapped mass of plastic material may be delivered from the support member.

The present invention is not primarily concerned with the handling and supplying of enwrapments since it is contemplated that the plastic mass may be deposited onto any suitable sheet material or preformed enwrapments. Most plastic materials have a tendency to adhere to surfaces which they contact and therefore where it is desired to provide accurately measured masses they should be deposited directly onto sheet material for packaging.

Since the drawings illustrate the forming nozzles as extending outwardly and downwardly from the casing 3 at an angle to the horizontal which is especially advantageous in the forming of plastic masses from a relatively soft plastic material it is believed desirable to utilize a V-shaped enwrapment and to close the outer end of the enwrapment in the region of its apex. Fig. 11 illustrates how this may be done. It shows the end of the plastic mass and the support member 24 opposite to that shown in Fig. 9. Two flange members 63 and 64 may be mounted to project upwardly from the V-shaped sides of the jaw member 24 with a portion of the leading flange member 63 overlapping a portion of the trailing flange member 64. These flange members may be disposed at a slight angle with respect to each other to provide an opening between their overlapped portions. When the V-shaped enwrapment is placed in the member 24 the end portion of the apex of the enwrapment indicated by the numeral 65 in Fig. 11 may be disposed between the overlapped portions of the flanges 63 and 64 and will be angularly disposed with respect to the balance of the apex of the enwrapment. This will act as an enclosure for the outer end of the trough provided by the enwrapment as it rests upon the jaw member 24. The closed end portion of the enwrapment will create a limiting position to stop the plastic mass if such mass should have any tendency to slide or flow after it has been deposited on the enwrapment.

Figure 12:
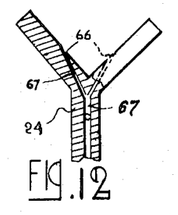
Fig. 12 is a fragmentary elevational view partially in section of the member which supports the mass to illustrate how enwrapments may be gripped.

To assure that the enwrapment after having been properly placed in the support member 24 retains this position, it is believed preferable to provide a suitable gripping means to hold the wrapper to the support member 24. This is deemed desirable in the production of uniform packages since each plastic mass may be accurately positioned with respect to the marginal edge portions of each enwrapment. To accomplish this the V-shaped surfaces of the member 24 may be provided with openings 66 which openings may be connected by passages 67 extending through the member 24 to a suitable pump (not shown) which exhausts air therefrom. The connection of the passages 67 with the vacuum pump is not shown in the drawings since such connections are considered conventional. The vacuum pump may be connected to one or more stationary manifolds of the desired arcuate extent which may be disposed in alignment with a plurality of rotary ports carried by each of the wheels 25. The rotary ports may then be connected to the jaw members 24 by flexible conduits to provide vacuum along the surfaces of the members 24 sufficient to grip enwrapments disposed thereon. Such a construction also permits secure holding of the enwrapments when the members 24 move radially with respect to the wheels 25 as well as when the members 24 move in a rotary direction as the wheels 25 revolve.

In the form of the invention shown in Figs. 1 through 4 the stream of plastic material is directed so that it flows alternately to one of a pair of forming apertures or nozzles. To obtain increased production the plastic stream may be directed so that it will be transmitted successively to a greater number of forming apertures. For example, a greater number of forming apertures could be provided in communication with the flow director. The design and operating cycle of the flow director may then be modified to transmit the flow successively and one at a time to the various forming apertures. The spacing of the apertures may be increased to provide for the support members and associated mechanism to remove the formed masses and advance them for packaging. Since this increased spacing would increase the amount of plastic material in the forming unit to be advanced, it is believed preferable to increase the capacity in the manner shown in Figs. 13, 14 and 15.

In this modified form of the invention four forming apertures are provided and such increased capacity is readily obtained by the use of two forming units similar to that disclosed in Figs. 1 through 4. The units are mounted in spaced relation with means to alternately transmit the flow to one of the two spaced units. The means for changing the flow may comprise a flow director with associated accumulator pockets generally similar to the flow directing means of each of the forming units previously described.

Figure 13:
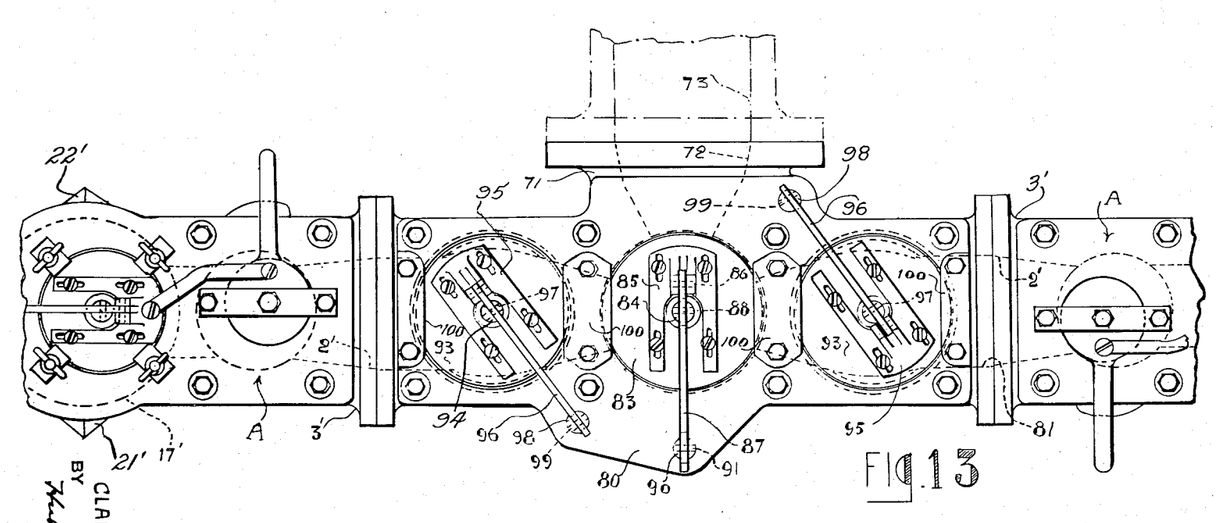
Fig. 13 is a top plan view of a modified form of apparatus embodying the present invention.

In Fig. 13, each of the spaced forming units comprises a casing 3' having an inlet 2' in communication with a metering device (indicated generally by the letter A) which transmits the plastic material to an oscillating flow director (such as the conical valve body 17'). The flow director changes the course of the plastic stream at intervals to one or the other of the pair of forming apertures or nozzles 21' and 22'. Each of these forming units operates in a manner as has been described to produce plastic masses at each of the forming apertures.

Figure 14:
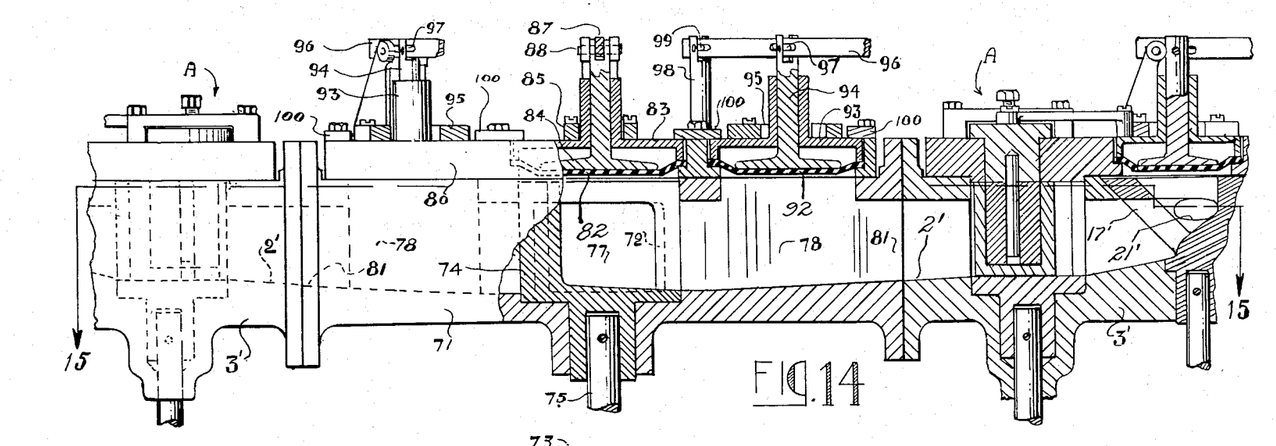
Fig. 14 is an elevational view with parts broken away to show details of construction of the mechanism shown in Fig. 13.
Figure 15:
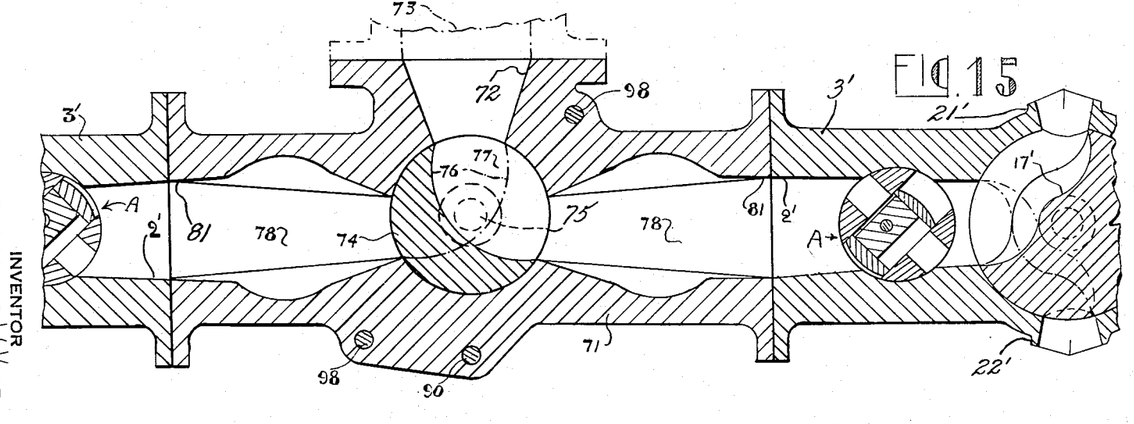
Fig. 15 is a sectional view taken substantially on line 15—15 of Fig. 14.

Disposed between the pair of units is a housing 71 having an inlet 72 to which may be connected a suitable source of supply of plastic material indicated by dot and dash lines 73. Adjacent the inlet a flow director is provided to direct the flow of the plastic stream entering the inlet to one or the other of the spaced units for producing formed plastic masses. Figs. 14 and 15 show the flow director as comprising a cylindrical valve 74 secured to an oscillating shaft 75 which may be driven intermittently by any suitable mechanism (not shown). The portion of the member 74 in communication with the inlet 72 may be cut away to provide a crescent shaped valve, the interior of the crescent being defined by a surface 76 to form a passageway 77 leading from the inlet 72 of the housing 71 to one or the other of a pair of passageways 78 which lead to the inlets 2' of the units for producing formed plastic masses. In the position shown in Fig. 15 the valve 74 is disposed so that plastic from the source of supply will be directed through the housing and along the passageway 78 toward the right-hand side of Fig. 15. When the valve is moved to its opposite position shown in dot and dash lines in Fig. 15 the stream of plastic will be transmitted to the opposite passage 78 leading toward the left-hand side of Fig. 15.

The housing 71 may be closed at the top by a suitable lid or cover plate 80 which may be bolted to the housing to enclose the passages therethrough. Above the valve 74 an accumulator pocket may be provided to temporarily receive the flow of plastic material from the source of supply during oscillation of the valve 74, since the source of supply is preferably actuated to flow plastic material continuously through the passage 77 to one of the passages 78. It is believed desirable to transmit enough of the plastic stream to each forming unit during each open position of the valve to provide at least two plastic masses and thus reduce the number of times which the valve 74 must oscillate, and accordingly an accumulator pocket may be provided, opening successively to each of the passages 78 between the valve 74 and the outlets 81 of the housing 71.

As shown in Fig. 14, the three accumulator pockets may be disposed in relatively closely spaced relation along the cover plate 80 of the housing 71. The central accumulator, above the valve 74, may comprise a diaphragm 82 having its edge portions supported on an annular shoulder or ledge in the cover plate 80 surrounding an aperture extending therethrough. The diaphragm 82 may be held in place by a cap member 83 which holds the outer edges of the diaphragm 82 against the cover plate 80. Slidably mounted within the cap member 83 and engaging the top surface of the diaphragm 82 is a plunger member 84 which controls the movement of the diaphragm and thus controls the opening and closing of the accumulator pocket.

To actuate the plunger 84 a bracket 85 may be mounted on the cap member and carries a pivot pin 86 which passes through an aperture in a free end of a lever 87. The plunger 84 is bifurcated at its upper end and carries a pivot pin 88 which passes through a slot in the lever 87. A reciprocating rod 90 is journaled in the housing 71 and at its upper end is pivotally mounted to the lever 87 by a pivot pin 91. The reciprocating rod 90 may be driven by any suitable mechanism (not shown) so that it raises and lowers, through the action of the lever 87, the plunger 84 to open and close the accumulator pocket during the oscillatory movement of the valve 74. As the valve 74 begins to turn to change the direction of flow of the stream of plastic entering the housing 71 from the source of supply, the reciprocating rod 90 is raised, lifting the plunger 84 and permitting the diaphragm to raise and form an accumulator pocket opening into the under side of the cover plate 80. Plastic material flowing from the source of supply may then be received in the accumulator pocket during the movement of the valve 74. When the valve has finished its movement so that the passage 77 therethrough is aligned with the opposite passage 78 the reciprocating rod 90 may be lowered to depress the plunger 84 and the diaphragm 82 to evacuate the accumlator pocket. The plastic material temporarily received in the accumulator pocket is thus forced into the stream of plastic flowing through the passages 77 and 78 to one of the plastic forming units.

During each period that the valve 74 is directing the flow of plastic through a passage 78 to one of the plastic forming units, sufficient plastic may be flowed therethrough to form a plurality of individual masses and since such flow will of necessity be greater than can be received by the forming units it is necessary to temporarily receive plastic material in the accumulator pockets above each of the passages 78.

Each of these accumulator pockets above the passages 78 may comprise a diaphragm 92 supported on an annular ledge or surface surrounding an aperture extending through the cover plate 80 (see Fig. 14). The outer edges of the diaphragm 92 may be held in place by a cap member 93. Disposed within the cap member 93 and mounted for sliding movement with respect thereto is a plunger member 94, the under surface of which contacts the upper surface of the diaphragm 92 to flex the diaphragm and close or open the accumulator pocket. To actuate the plunger member 94 the cap member 93 has secured thereto a bracket 95. Pivotally mounted to the bracket 95 is an end of a lever 96 which is connected to the bifurcated top end of the plunger 94 by a pin 97 held by the bifurcated ends of the plunger and passing through a slot in the lever 96. The opposite free end of the lever 96 is pinned to a reciprocating rod 98 by a pin 99 which is held by bifurcated ends of the rod and passes through a slot in the lever 96.

Each of the reciprocating rods 98 may be driven in timed relation by suitable mechanism (not shown) to cause the accumulator pockets to temporarily receive plastic material flowed from the source of supply through the passage 77 of the valve 74 and which material cannot be received by the forming unit with which the passage 78 is in communication at that particular time. When the valve 74 has been oscillated to feed plastic material to the other one of the forming units the reciprocating rod 98 may be moved in the opposite direction to depress the plunger 94 and evacuate the accumulator pocket forcing the plastic material temporarily received therein through the passage 78 and into the forming unit.

The cap members 83 and 93 of the three accumulator pockets may be held to the cover plate 80 to securely hold the diaphragms 82 and 92 in place by clamp members 100 bolted to the cover plate 80.

By this construction plastic material may be flowed at the desired rate from the source of supply to each of the spaced forming units with the plastic material remaining in continuous motion. Each time that the valve 74 opens towards one of the forming units, enough material may be flowed therethrough to form a plurality of plastic masses with a portion of such material being temporarily received in the accumulator pocket above the passage 78. At the same time the flow of the plastic material from the source of supply is not stopped during the switching of the valve 74 since the accumulator pocket above the valve will temporarily receive plastic material while the valve is moving. It may be noted from Fig. 15 that the valve 74 is positioned and dimensioned so that it can only open to one of the passages 78 at any one time. In this way plastic material is not permitted to flow simultaneously to more than one of the passages 78. Thus when the source of supply is feeding plastic material continuously to the inlet 72 it is desirable to provide an accumulator to avoid the application of undue pressure on the plastic material during switching of the valve.

It is advantageous to provide for adjustment in the size of the accumulator pockets in the housing 71 which adjustments may be necessary to properly accommodate the flow of plastic material when the measured amount of the individual plastic masses is varied by changing the quantity of plastic delivered by the metering devices. The volume of the accumulator pockets in the housing 71 may be varied in the same way as shown in Fig. 3 in connection with the accumulator pocket above the valve body 17. The brackets 85 and 95 may be adjustably mounted for sliding movement along the cap members 83 and 93 respectively to permit longitudinal movement of the levers 87 and 96. This causes a change in the lengths of the lever arms and accordingly varies the strokes of the plungers 84 and 94 without changing the amount of reciprocation of the rods 90 and 98.

By the present invention an extremely advantageous method and apparatus for producing accurately formed masses of plastic material is provided. The plastic material may be flowed in a continuously moving stream from the source of supply to the forming aperture. The plastic material may be transmitted through relatively smooth-walled passages and through a metering device which may act to increase the pressure by which the plastic is advanced without unduly masticating or working the plastic material. Not only does this prevent detrimental effect on the composition or physical characteristics of the plastic material but it is felt that it will result in increased accuracy of each of the measured plastic masses due to a more nearly uniform consistency.

It may be noted that the device is readily adjustable to handle a range of measured amounts of plastic material. As previously described, the volume handled by the metering device may be varied by changing the eccentricity of the pin 8 by movement of the handle 16. This will vary the length of stroke of the piston and shuttle members and as described in connection with Figs. 1 through 4, movement of the handle 16 will also vary the permissible volume of the accumulator pocket above the valve 17 through the link 43. Obviously the rate of flow of plastic material from the source of supply may also be varied when the rate of flow through the metering device is adjusted.

Where a plastic material is being handled which will not be adversely affected by changes of pressure, it may not be necessary to vary the volume of the accumulator pocket, and in fact, it may be feasible to dispense with an accumulator pocket altogether. Where precise accuracy in the amount of each individual mass is desired, the use of an accumulator pocket during switching of the flow director is believed to be very beneficial since pressure in the passages between the metering device and the forming apertures will not be increased and the possibility of the plastic material flowing through the forming opening when the passages are partially opening can be minimized and even prevented.

The metering device disclosed in the drawings is considered advantageous since it is positive in its action and may be utilized to increase the pressure with which plastic masses may be formed. Further, during each revolution it transmits four charges and the strokes of the piston and shuttle overlap to avoid pulsating effect. As described, the charges transmitted by each stroke of the piston and shuttle may be equal. Although the face of the shuttle has the appearance of greater length than that of the piston the shuttle will be of less depth than the piston since it slides in a transverse groove of the piston. Each charge transmitted by the piston and shuttle may comprise the full amount of an individual mass to be formed or may be some suitable fractional part. A desirable arrangement is to proportion the size of the parts so that an individual mass is the result of one stroke each of the piston and shuttle. Each revolution of the rotor will therefore transmit sufficient plastic material to form two masses, one from each of the forming apertures. In this way wear of the parts of the metering device will not detract from the uniformity of the masses produced because each mass is the result of one piston stroke and one shuttle stroke with the amount of the strokes being adjustable by changing the eccentricity of the pin.

Another desirable feature of the present invention is the fact that during the flow of the stream of plastic material, there is no attempt to split or bisect the stream. The entire stream is directed to one of a plurality of locations in succession. This also facilitates obtaining greater accuracy in the formed plastic masses. The flow directors illustrated as the conical valve 17 and the cylindrical valve 74 are preferably designed so that only one passageway can be opened or partially opened at any one time.

In connection with the form of the invention shown in Figs. 13 through 15 where increased capacity is obtained by directing the flow to a larger number of forming apertures, it is contemplated the mechanism can be considerably simplified. For example, in the handling of plastic materials which are not adversely affected by pressure variations, the housing 71 and its associated mechanism may be replaced by a header having passages leading to units for forming plastic masses. In this case sufficient pressure must be exerted at the source of supply to fill the passages and insure that the metering devices receive an adequate supply of plastic material. It is felt that the flow director and its associated accumulator pockets illustrated in the drawings is preferable, to permit feeding a plastic material with relatively smooth, even pressures and at the same time to assure that the metering devices receive a proper supply.

The use of diaphragms to control the accumulator pockets is considered desirable since the elasticity of the wall of the accumulator pocket prevents undue working of the plastic material and by properly clamping the edges of the diaphragm to seal the pockets, the possibility of leakage is reduced over other forms of accumulator pockets, such as a sliding piston member. With relatively large diameter diaphragms the amount of flexing thereof may be reduced and thus the plastic material is not required to be flowed through angular or distorting passages. With the plunger members positively driven to cause the accumulator pockets to open and evacuate, greater control of the flow of the plastic is provided. The fit of the stem of the plunger with its associated cap member may provide for the passage of air to obviate any effects of vacuum above the diaphragm. If desired the plunger stem may be fluted to permit the passage of air beneath the cap member or the cap member may be provided with air passages.

Precise accuracy of the formed individual plastic masses is also assisted by utilization of a severing means or blade to shear the plastic stream against the end of the forming aperture. It may be noted from Fig. 9 that when a blade such as that shown is used, the inner surface of the blade will wipe itself against the end of the nozzle. At the same time the outer surface of the blade will be wiped against the inside end portions of the sheet material or enwrapment.

It may also be noted that the apparatus disclosed in the drawings, and particularly those parts which contact the plastic material, are readily accessible for cleaning purposes. This is of great importance in the handling of edible plastic materials where the health requirements emphasize this factor. By removing the cover plates or lids, the interior passageways are exposed and the relatively few moving parts contacting the plastic may be readily removed for cleaning and/or sterilizing.

It will be appreciated that in the drawings, proportions have been exaggerated in some instances to provide a greater understanding of the invention.

It will be understood that the foregoing description of preferred embodiments of the invention is for the purpose of explanation and illustration and numerous variations and modifications other than those which have been described may be made without departing from the spirit of the invention.

What I claim is:

1. Apparatus for producing measured masses of plastic material which comprises a metering device and drive means therefor to cause a stream of plastic material to flow at a predetermined rate, flow directing means to transmit said stream of plastic material successively to each of a plurality of forming means, means for temporarily receiving a portion of said stream during movement of said flow directing means, an adjusting mechanism for said metering device to vary the rate of flow of plastic material therefrom, and means actuated with said adjusting mechanism to correspondingly adjust the amount of said stream temporarily received by said receiving means.

2. Apparatus for forming measured masses of plastic material which comprises, continuously driven means for metering and advancing predetermined amounts of plastic material under pressure from a source of supply as a part of a continuous stream, a movable directing member communicating with the metering means to cause said plastic stream to flow alternately toward one of two predetermined locations, means communicating with the last named means for temporarily accumulating a portion of said stream during movement of said member, a pair of forming members communicating with the means to cause the plastic stream to flow alternately and to which said stream is alternately directed to form measured masses of plastic material, and severing means associated with said forming members to separate formed measured masses from said stream.

3. Apparatus for producing formed masses of plastic material which comprises a source of supply of plastic material under pressure, a plurality of metering devices to cause said plastic material to flow at a predetermined rate, means to direct material to said devices from said source of supply, a plurality of forming means for each of the metering devices, each said forming means having an extruding orifice, a channel leading from each metering device to the respective plurality of forming means, and movable flow directing means in each of the channels for directing material successively to the respective orifices.

4. Apparatus for producing measured masses of plastic material comprising a housing, inlet means to direct a flow of plastic material into the housing, a movable metering device in the housing, a movable flow directing device in the housing, conduits between the inlet means and metering device and movable flow directing means, a plurality of forming means communicating with the movable flow directing means, and a cover plate for the housing enclosing the inlet and metering devices.

5. In the method of producing a formed mass of plastic material from a stream of confined plastic material fed continuously under relatively low pressure, said method comprising measuring successive quantities of material from said stream while confining the same and maintaining the continuous advancement thereof under pressure, subjecting said successive quantities of material to increased pressure, and directing said successive quantities into separate paths.

6. The method of producing formed masses of plastic material from a continuously advancing flow of confined plastic material, said method comprising continuously metering the stream of plastic material into successive quantities while confining the same, directing said quantities into a second stream under pressure, directing material from the second stream into a first path for a predetermined time, and then directing the material from the second stream into a second path.

7. The method of producing formed masses of plastic material from a stream of plastic material flowing at a predetermined rate, said method comprising alternately directing said stream to one of a pair of separate paths, diverting a portion of said stream into an accumulator pocket while changing the direction of flow from one of said paths to the other, returning said diverted material from the accumulator pocket to the path to which said direction of flow has been changed, and forming unit masses from the material of each of said paths.

8. Apparatus for producing measured masses of plastic material which comprises, a conduit providing an uninterrupted stream of plastic material flowing therethrough under pressure, a metering device communicating with the conduit to receive plastic material therefrom, means to drive the metering device to cause the plastic material to flow at a predetermined rate, and a flow directing means communicating with the metering device to successively transmit said stream of plastic material for predetermined time periods to each of a plurality of forming means.

9. Apparatus for producing measured masses of plastic material which comprises, means providing a source of supply of plastic material flowing under pressure, a metering device communicating with the source of supply to receive plastic material under pressure, means to drive the metering device to cause the material to flow at a predetermined rate therefrom, a flow directing means communicating with the metering device, a plurality of forming means spaced with respect to the flow directing means, means including the flow directing means to successively transmit said stream of plastic material for predetermined time periods to each of said forming means, and an accumulating mechanism communicating with the flow directing means for temporarily receiving plastic material from said metering device while said flow directing means is changing the flow of said stream of plastic material from one to another of said forming means.

10. The method of producing formed masses of plastic material from a continuously advancing flow of plastic material, said method comprising continuously metering the stream of plastic material into successive quantities, directing said quantities into a second stream, directing material from the second stream into a first path for a predetermined time, accumulating plastic material under pressure from the second stream, and then, while so accumulating plastic material, directing the material from the second stream into a second path.

11. Apparatus for producing measured masses of plastic material which comprises, means to supply a confined flow of plastic material under pressure, a metering device communicating with the supply means to receive plastic material therefrom, means to drive the metering device to cause the material to flow at a predetermined rate, a plurality of forming means communicating with the metering device each having an extruding orifice, a flow directing means in the communication between the metering device and the forming means to successively transmit said stream of plastic material for predetermined time periods to each of the respective forming means, and means for shearing the plastic mass extruded from said orifices.

References Cited in the file of this patent

UNITED STATES PATENTS

| | | |
|---|---|---|
| 443,862 | Mitchell | Dec. 30, 1890 |
| 997,554 | Holmes | July 11, 1911 |
| 1,418,658 | Ladd | June 6, 1922 |
| 1,627,297 | Surico | May 3, 1927 |
| 1,801,967 | Merlino | Apr. 21, 1931 |
| 1,867,198 | Waite | July 12, 1932 |
| 1,872,103 | Bergman | Aug. 16, 1932 |
| 1,888,542 | Rosberg | Nov. 22, 1932 |
| 2,018,692 | Waite | Oct. 29, 1935 |
| 2,018,693 | Waite | Oct. 29, 1935 |
| 2,105,211 | Bessonette | Jan. 11, 1938 |
| 2,257,695 | Lihotzky | Sept. 30, 1941 |
| 2,318,128 | Tabb | May 4, 1943 |
| 2,424,949 | White | July 29, 1947 |
| 2,553,250 | Gross | May 15, 1951 |
| 2,577,925 | Sternbach | Dec. 11, 1951 |

FOREIGN PATENTS

| | | |
|---|---|---|
| 53,954 | Netherlands | Feb. 15, 1943 |
| 294,096 | Great Britain | Sept. 27, 1928 |